April 22, 1958    G. R. CLARKE    2,831,520
TELESCOPING CAPTIVE SCREW HOLDER WITH STOP MEANS FOR SCREW
Filed July 20, 1954

INVENTOR:
Gilbert R. Clarke,
By Herbert E. Medcalf
His Patent Attorney

United States Patent Office 2,831,520
Patented Apr. 22, 1958

2,831,520

TELESCOPING CAPTIVE SCREW HOLDER WITH STOP MEANS FOR SCREW

Gilbert R. Clarke, Hawthorne, Calif., assignor to Northrop Aircraft, Inc., Hawthorne, Calif., a corporation of California Application July 20, 1954, Serial No. 444,507

2 Claims. (Cl. 151—69)

This invention relates to fasteners, and more particularly, to a screw type of fastener assembly which is retained in position on one of the units to be attached, when disconnected.

Broadly, self-retained fasteners are well known, but there is a need for improved reliability, ease of operation, and over-all efficiency. Improved packaging techniques and increased use of readily interchangeable components, for example in the electronics field, have made this need more apparent.

It is an object of the present invention to provide a secure interconnection between two units, with a fastening member holder being fixed to one of the units, and with the fastening member being retractable or recessed so as not to be subject to damage when its associated unit is resting alone.

Another object of my invention is to provide a new and novel self-retained fastener which is operable in a reasonably short time using only an ordinary hand tool.

A still further object of this invention is to provide a novel self-retaining fastener which is simple, rugged, small in size, and suitable for low-cost mass production.

It is another object to provide a part-retained fastener wherein a positive indication is given when the fastener is unlocked or disconnected, and wherein the disconnected position assures an absolutely freed condition of the unit being removed, so that such a unit having a plurality of fasteners can be easily removed without the inconvenience of some of the fasteners being or remaining caught in parts of the other unit.

Other objects and features of advantage will be noted in the detailed description of specific apparatus to follow.

Briefly, my invention comprises a tube attached to an outside metal portion of one unit, preferably by swaging, with a machine screw and spring assembled within the tube. Internal retaining ridges or other suitable means in the tube hold the screw inside the tube under a spring load. An internally threaded member, such as a nut, is mounted on the other unit to be attached to the first. When the units are secured together, the screw is pushed to an extended position from the tube to engage the nut, and when the units are disconnected, the screw is spring-retracted completely within the tube, leaving a flat surface on the mating side of both units. Several variations of tube construction are feasible.

The present invention will be more fully understood by reference to the following detailed description of specific embodiments, and to the accompanying drawings.

Figure 1:
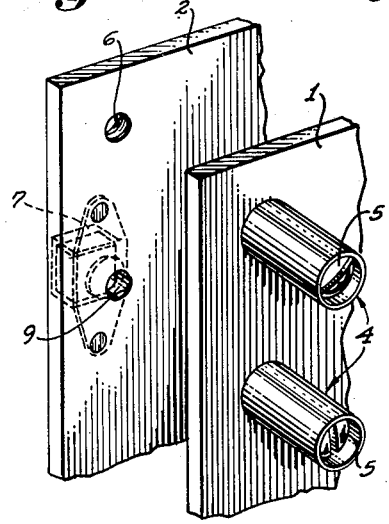
Figure 1 is a perspective view of the edges of two units to be fastened together, showing an over-all appearance of the present captive screw.

Referring first to Figure 1, a base member 1 of a component assembly is desired to be removably attached to a mounting plate 2, for example. Two captive screw holders 4 constructed according to the present invention are shown installed on the member 1, each holder containing a screw 5. The mounting plate 2 has, for illustrative purposes, a tapped hole 6 for receiving the screw of the upper holder, and a floating plate nut 7 mounted behind a guide hole 9 in the plate 2 to receive the lower holder screw. Any desired type of female fastening is considered satisfactory and does not form a part of this invention, but it is preferably flush mounted or recessed to give a flat outer surface of the plate 2. When a plate nut is used, it is common practice to incorporate in it a self-locking nut of some suitable form, thus eliminating the need for cotter pins, lock wire, or the like.

Figure 2:
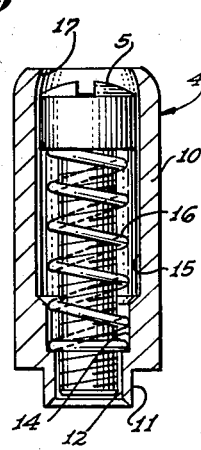
Figure 2 is a cross-sectional view of one embodiment of captive screw holder, showing the screw in its retracted position.

Figure 2 shows a typical form of the captive screw holder 4. Here, a cylindrical tube 10 has a short axial end projection 11, a first inner bore 12 through the projection 11, a second, larger bore 14 adjacent the first, and third, still larger bore 15 adjacent the second and extending for a major distance along the tube 10. The screw 5 is positioned in tube 10 with its shank just fitting in the third bore 15. A light compression spring 16 around the screw shank just fits in the second bore 14. A fillister head machine screw is shown, although other types of screws may be used. After the spring 16 and screw 5 are in place, the upper end of the tube 10 is crimped over at 17 to retain the parts.

Figure 3:
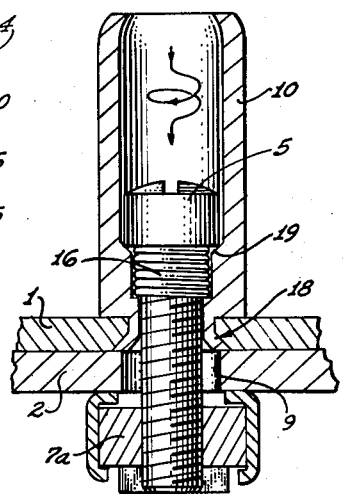
Figure 3 is a cross-sectional view of the same embodiment, showing it in the secured position with the two units attached together.

The lower end projection 11 is inserted in a countersunk hole 18 in the base member 1, as shown in Figure 3, and the projection is then permanently fixed by peening or swaging outwardly to form a flush outer surface. As also shown in Figure 3, the mounting plate 2 has been attached and the screw 5 is in the tightened position, threaded into a self-locking plate nut 7a fixed to the back side of the plate 2 and aligned with the guide hole 9. In this tightened position, the screw head is threaded tightly against a ridge 19 located between the two larger tube bores at a predetermined height so that the spring 16 will not be completely jammed and possibly damaged. A strong attachment is thus provided, like any normal bolt and nut.

When each screw of the various holders of the base member 1 is removed from its nut 7 or 7a, the spring 16 forces the screw 5 up to the top of the tube 10, which pulls the screw end just into the tube lower end, and the units are now separated. In this condition, it is to be noted that the fastener screws are held in their assembly and will not become lost, and will not be damaged when the entire unit is moved around with the base member 1 on the bottom, or resting on the base member 1. When the units are again attached, or a replacement unit is installed on the mounting plate 2, the screws are obviously already on hand and located at the proper places, ready to be attached with an ordinary screw driver.

Figure 4:
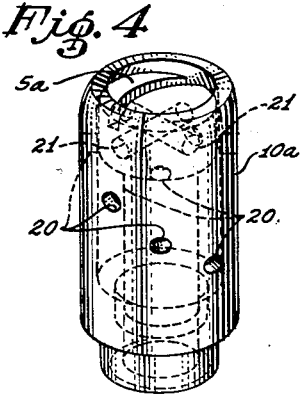
Figure 4 is a perspective view of another tube embodiment, showing locking means which may be employed when no lock is incorporated at the nut end.

In the event that a self-locking nut is not used, the construction of Figure 4 may be used to lock the screw from the top. The tube 10a in this embodiment is provided with a helical arrangement of diametrically opposed holes 20. The direction of the helical path of holes 20 is naturally opposite from that of the threads on the screw 5a. Safety wire holes 21 in the standard fillister head can be used in alignment with a pair of tube holes 20 at any of various heights to install lock wire or other devices therethrough. This will positively insure that the screw 5a will not turn loose, since the tube 10a will be rigidly secured to the base member 1.

Figure 5:
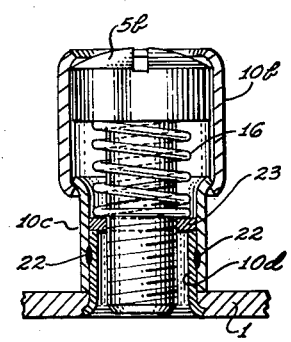
Figure 5 is a sectional view of an alternate tube embodiment, showing a collapsible tube structure designed to occupy less space.

A further example of how the present invention can be modified is shown in Figure 5. Here, the holder is made to result in two telescopically overlapping sections 10b and 10c, thus permitting the holder to become shorter as the screw 5b is depressed. In this case, an added internal tube section 10d is secured to section 10c, by welds 22, for example, to support a flat washer 23 upon which the spring 16 rests. A machined part can be employed for the lower sections 10c and 10d if desired, or other equivalent structure may be adopted. In this manner, a lesser space is occupied after the units are attached together, and the space gained may be utilized by other components if so required.

Figure 6:
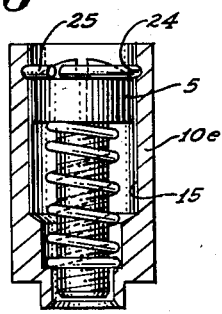
Figure 6 is a sectional view showing a different screw retaining means in the tube, to permit screw removal and replacement.

Next, Figure 6 shows a holder having a typical tube 10e except that the third bore 15 contains an inner groove 24 near the top to hold a snap ring 25. The upper end of tube 10e is not crimped in, but has the same inside diameter as bore 15. The snap ring 25 normally holds the screw 5 in the tube 10e, but is removable to allow replacement of a screw if it should become necessary.

Figure 7:
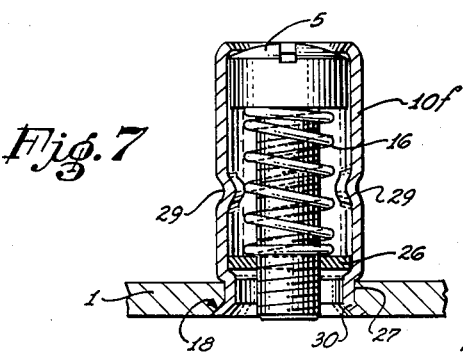
Figure 7 is a sectional view of a further tube embodiment, showing a construction adapted to low cost quantity production.

Another tube construction is disclosed in Figure 7, where the tube 10f is a length of aluminum tubing, for example, with constant wall thickness, shaped by the use of stamping dies rather than by machining operations. The process is as follows: A stop washer 26 is inserted in the tube 10f. The tube is crimped in a stamping die to form a lower end section 27 of relatively smaller diameter and to form three circumferential indents 29 above the stop washer 26. The screw 5 and spring 16 are then installed, and the top of the tube 10f is bent inwardly to confine the internal parts. The holder assembly is then complete. When installed in the countersunk hole 18 of the base member 1, the end section 27 is swaged or staked out, at 30, as previously.

The indents 29 of Figure 7 perform the same screw head seating function as the ridge 19 in the preceding embodiments. This construction is well suited for economical production of large quantities of holders, and utilizes only stock parts.

From the foregoing, it is seen that a very reliable and convenient fastening device is obtained by utilizing the principles of the present invention. It is particularly adapted to the assembly of sub-units which can be wholly replaced when needed, to maintain an overall system in operating condition. The various modifications described are not intended to cover all possible examples of design variations, and it is to be understood that the invention as claimed is not limited to the specific embodiments disclosed herein.

It is further obvious that when the screw 5 of the present fastener is unscrewed from the attached unit, it will be forced by the spring 16 to its fully retracted position at the end of the tube 10, thus giving a positive visual indication that the fastener is unattached. When a plurality of the fasteners are thus disconnected to remove the attached unit, and the screws are retracted as stated above, it will be noted that the screws are all completely freed and separated from the nuts and bores of the attached unit. A large chassis, panel, or other unit can therefore be readily lifted and removed from its location without any of the screws remaining temporarily caught by adjacent edges or threads, even when the fasteners are positioned with the screw heads facing up. This saves time, preserves screw threads, and relieves awkward situations where other types of fasteners may stick.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. A captive fastener comprising hollow cylindrical tubular means having a constant wall thickness, a first reduced diameter portion of short length near a first end of said tubular means adapted to be inserted in an opening in a base member for securing thereto, a compression spring inserted in said tubular means from a second end thereof, stop means abutting one end of said spring and preventing its passage into said first reduced diameter portion, a threaded screw member within said tubular means pointing toward said first end and inserted through said spring, a head on said screw abutting the other end of said spring and fitting loosely within said tubular means to allow extension of the threaded end of said screw under increasing spring load beyond and through said first end, the diameter of said head substantially exceeding the outer diameter of said spring, screw retaining means at said second end of said tubular means acting on said head to prevent said screw from coming out said second end, the top of said head being accessible through said second end, a second reduced diameter portion of said tubular means between said first portion and said screw retaining means at a predetermined position where the under side of said head contacts said second reduced diameter portion in the extended position of said screw just before said spring is solidly compressed, the outer diameter of said spring being less than the inner diameter of said tubular means at said second portion so that said spring can freely pass said second portion, whereby a positive seat is provided for said screw, when extended, and whereby said spring is not damaged, said tubular means being capable of final forming by the process of stamping.

2. A captive fastener comprising a hollow cylindrical tube assembly of constant wall thickness tubing, a first reduced diameter portion near a first end of said assembly adapted to be inserted in an opening in a base member for securing thereto, a stop washer in said assembly beyond said first reduced diameter portion from said first end and prevented from reaching said first end by the inwardly extending edge of said first portion, a compression spring inserted in said assembly from a second end thereof with one end of said spring bearing against said stop washer, a threaded screw member within said assembly pointing toward said first end and inserted through said spring and said stop washer, a head on said screw abutting the other end of said spring and fitting loosely within said assembly to allow extension of the threaded end of said screw under increasing spring load beyond and through said first end, the diameter of said head substantially exceeding the outer diameter of said spring, screw retaining means at said second end of said assembly acting on said head to prevent said screw from coming out said second end, the top of said head being accessible through said second end, a second reduced diameter portion of said assembly between said first portion and said screw retaining means at a predetermined position where the under side of said head contacts said second reduced diameter portion in the extended position of said screw just before said spring is solidly compressed, whereby a positive seat is provided for said screw when extended, the outer diameter of said spring being less than the inner diameter of said assembly at said second portion so that said spring can freely pass said second portion, said tube assembly comprising a plurality of freely telescoping tube sections each having a constant wall thickness, whereby said assembly can be shortened when said screw is extended, the innermost section being at said first end of said assembly, said sections having limit means to determine the maximum length of said assembly, the inside end of said innermost section forming said first reduced diameter portion, and the inside end of the next section forming said second reduced diameter portion when said fastener is installed in the base member.

References Cited in the file of this patent

UNITED STATES PATENTS

| | | |
|---|---|---|
| 1,099,510 | O'Connor | June 9, 1914 |
| 1,251,676 | McCaffray | Jan. 1, 1918 |
| 1,613,906 | Rohour | Jan. 11, 1927 |
| 1,639,661 | Newcomb | Aug. 23, 1927 |
| 1,911,820 | Fitzgerald | May 30, 1933 |
| 2,564,101 | Dzus | Aug. 14, 1951 |